Sept. 25, 1951 | E. M. DELORAINE ET AL | 2,568,721

COMMUNICATION SYSTEM UTILIZING CONSTANT AMPLITUDE PULSES

Filed Oct. 8, 1947 | 3 Sheets-Sheet 1

INVENTORS
EDMOND M. DELORAINE
ALEC H. REEVES

BY

R. P. Morris

ATTORNEY

INVENTORS
EDMOND M. DELORAINE
ALEC H. REEVES
BY
R. F. Morris
ATTORNEY

INVENTORS
EDMOND M. DELORAINE
ALEC H. REEVES
BY
R. P. Morris
ATTORNEY

Patented Sept. 25, 1951 2,568,721

UNITED STATES PATENT OFFICE 2,568,721

COMMUNICATION SYSTEM UTILIZING CONSTANT AMPLITUDE PULSES

Edmond Maurice Deloraine, New York, N. Y., and Alec Harley Reeves, Surrey, England, assignors to International Standard Electric Corporation, New York, N. Y., a corporation of Delaware Application October 8, 1947, Serial No. 778,663
In France August 10, 1946

Section 1, Public Law 690, August 8, 1946
Patent expires August 10, 1966

10 Claims. (Cl. 179—15.6)

The present invention relates to transmission systems that employ impulse modulation. It is known that it has already been proposed to employ impulses for the transmission of messages, and particularly for the transmission of telephone currents.

Various devices have beeen proposed in which the message is transmitted by variation of impulses in amplitude, in duration or in position in time. The systems in which the impulses are not displaced in time have the advantage that the message is less affected by the interferences than in the other systems, because these impulses can be made active during a shorter time, and the receiving circuit can be blocked between the peak durations of the successive impulses.

The object of the present invention is an impulse transmission system in which the impulses are transmitted at quite definite fixed moments and have a constant amplitude.

According to certain features of the invention, the signals that transmit the message are explored at sufficiently close intervals according to the desired degree of fidelity, and impulses of a different kind are transmitted according to whether the amplitude of said signals is increasing, steady or decreasing at the time of exploration, i. e. depending upon whether the derivative of the function that represents the form of the signal is positive, zero or negative.

According to other features of the invention, the transmitted signals are employed at the receiving end for restoring the original wave shape, if not identically, at least approximately, and with all the more fidelity according as the cadence of the exploration is speedier. This result is obtained by a process of integration in which the wave shape is restored by accumulations or diminutions of the signals received during given time intervals, and this in correlation with the nature of the received impulses.

The devices employed in the invention are thus slightly affected by interferences, since the length of time during which the receiving circuit is in condition to receive can be reduced down to the duration of the impulses, thus considerably lessening the time during which interferences can act. Furthermore, since the amplitude of the impulse plays no part in the transmission of the message, it is possible to use only the portion of the impulse that has the maximum amplitude, so that interferences can only act on the message if they have exceptional amplitude.

The invention is explained hereunder for certain examples of embodiment described with reference to the appended drawings, in which:

Figs. 1*a* and 1*b* show diagrams employed in the description.

Figs. 2*a*, 2*b* and 2*c* show other diagrams employed in the description.

Figure 1A:
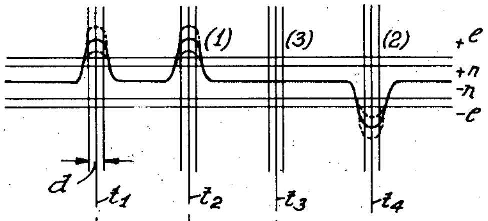
Figure 1B:
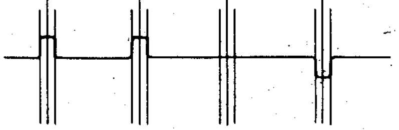

There are well known advantages obtainable from the use of impulses of constant amplitude, or of predetermined characteristics, at predetermined moments in the presence of noises or parasitic signals. Fig. 1 shows three examples of characteristic impulses that are produced at the moments $t_1$, $t_2$, $t_3$, and $t_4$. According to certain features of the invention, only three kinds of signals can be received at the receiving station at predetermined moments: a positive impulse of amplitude greater than or equal to $+l$ (1), a negative impulse of amplitude greater than or equal to $-l$ (2), or no impulse (3).

These impulses pass through their maximum amplitude at predetermined moments $t_1$, $t_2$, $t_3$ or $t_4$. For simplification of the drawings, it has been assumed that these impulses are equally spaced. It can be seen that if the noise level remains constantly between two extreme values $+n$ and $-n$, except for negligible time periods, and that if the level of the amplitudes of the impulses is considerably superior to these extreme values, i. e. $+l$ or $-l$, it is possible to determine in a perfectly definite manner whether these impulses have been received or not. A device that can be employed for this purpose is, for example, a triode amplifier, which may be suitably disposed in a known manner, and which can completely cut out the signals that do not reach a level equal to the $+n$ and $-n$ limits of the noise. The noise alone can accordingly in no case cause current to appear in the receiving circuit, whereas the signal impulses can always actuate the receiver. It must however be noted that the presence of the noise will always produce a certain modulation in time or in phase of the entering and leaving (leading and trailing) edges of the impulses, as well as a modulation of the maximum value of the impulses, but this effect is eliminated by the "window" devices in time. The device thus becomes similar to a telegraph system in which telegraph relays are replaced by vacuum tubes.

If the receiving circuit is designed in such a way as only to be able to operate during a time period less than that which elapses between the moments when the $+l$ or $-l$ limits are exceeded by the intensity of the signal added algebraically to the intensity of the noise, no phase modulation due to the noise can occur during the time while the impulse acts on the receiver. A system of this kind would thus be completely protected from the influence of outside noise. If, for example, the receiver is only in reception condition during the short period $d$ (Fig. 1a) centered at $t_1$, $t_2$, etc., the abovementioned result would be attained. The separate impulses shown in Fig. 1a will thus cause the passage of the currents shown in Fig. 1b, in which the influence of the noise has disappeared.

Figures 2A, 2B, 2C:
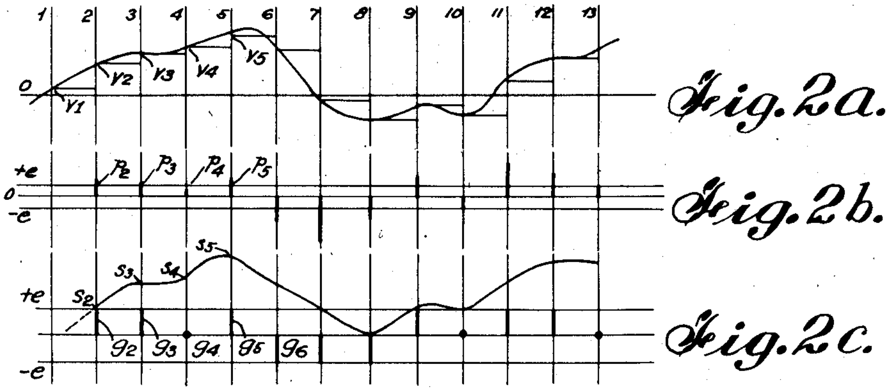

According to certain features of the invention, a device of this kind can be employed for the transmission of currents of constantly changing wave shape, e. g. voice currents. Fig. 2a shows an example of a wave shape of this kind. If the total period in question is divided into 12 equal fractions, as shown in the drawing, and if a device is employed at the transmitting station for determining the momentary amplitude of the voice wave for each of the 13 lines that divide the wave shape into sections, it is possible to characterize the original wave shape by such a succession of amplitudes, and to reproduce it at the receiving end. If it is assumed that the corresponding amplitudes are $v_1$, $v_2$, $v_3$, etc., and that the wave shape is divided up a sufficient number of times, the deformation (distortion) at the receiving end may be considered negligible. This is a well known fact, and it constitutes the basis of electric signal reception methods, such as superreaction (superregeneration). Experience has shown that voice currents can be commercially transmitted in this way with sufficient fidelity if the interval corresponding to the splitting up of the waves does not exceed 120 microseconds. One of the features of the invention consists in employing methods that make it possible to characterize the variations of amplitude of the thus fractionated wave by the use of impulses whose amplitudes have only two definite equal values, or are zero.

According to certain features of the invention, various means may be employed for this purpose.

It is possible, for example, to measure at the transmitting end the increase of amplitude between two splittings of the voice wave by comparing the amplitude of one fraction with the amplitude of the preceding fraction. If this increase is positive and exceeds a predetermined low value, a positive impulse of constant amplitude can be transmitted. If the increase over the preceding positive or negative amplitude is less than this critical value, no impulse will be transmitted. If the increase is negative and exceeds in absolute value the abovementioned critical voltage, a negative impulse of constant amplitude can be sent, and it may conveniently be the same as the amplitude of a positive impulse. Referring to Fig. 2a, it can be seen that the voice wave has increased at moment 2 by the quantity $v_2-v_1$ over moment 1. This increase is shown in Fig. 2b in the form of a positive amplitude $p_2$. Since this amplitude $p_2$ exceeds the abovementioned critical value $e$, a positive impulse $g_2$ is transmitted, as shown in Fig. 2c.

When, at moment 3, the voice wave has increased in amplitude by the quantity $v_3-v_2=p_3$, less than $p_2$ but still more than the critical value $e$, there is transmitted a second positive impulse $g_3$ having the same amplitude as that of impulse $g_2$. At moment 4, the increase in amplitude of the voice voltage over moment 3 is equal to $v_4-v_3=p_4$. As can be seen in Fig. 2b, this value is slightly less than the critical value $e$, and accordingly no impulse will be transmitted. At moment 5, the voltage increase $v_5-v_4=p_5$ is still greater than $e$, and another positive impulse $g_5$ will be sent. At moment 6, on the other hand, the voltage increase is negative and its value is higher than the limit $e$, and there is accordingly transmitted a negative impulse $g_6$ having the same amplitude as the preceding impulses. It is the same for all the voltage variations at the moments 7 to 13 shown in the drawing.

At the receiving end, the thus transmitted impulses are employed for the reconstitution of a wave shape that is at least close to the original wave shape, if not identical.

The receiving device comprises an integrating device, by means of which impulses $g_3$, $g_4$, etc. are added to the resultant amplitude of the sum of the preceding pulses so as to give the points $s_2$, $s_3$, $s_4$, etc. shown in Fig. 2c. If, on the other hand, the continuity is established between the various points, as shown in Fig. 2c, there is obtained a wave shape that can be brought as close as desired to that of the original voice current by increasing the number of fractionings per unit of time, and by reducing the value $e$ of amplitude change discrimination. A sufficient degree of fidelity for certain commercial uses is obtained by employing a cadence of 30 kilocycles.

Figure 3:
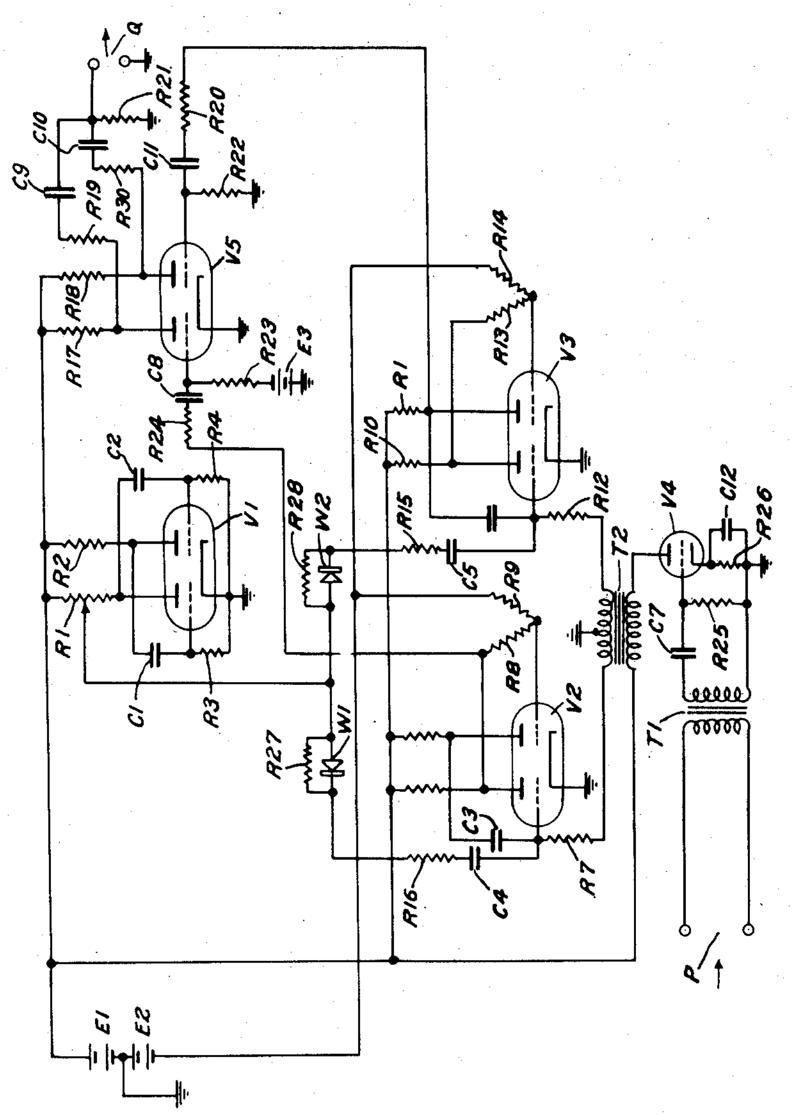
Fig. 3 is a schematic of one example of embodiment incorporating features of the invention.

Referring to the schematic of an example of a transmitter shown in Fig. 3, $V_1$ indicates a double triode connected as multivibrator in the conventional manner. Tube $V_2$ is a double triode that constitutes a tilting (flip-flop) circuit, i. e. a circuit that remains stable when there is no outer electromotive force, by allowing the current to pass into the left-hand anode, the right-hand one remaining inactive. If an impulse of suitable negative amplitude is applied to the left-hand grid, the circuit tilts (flips) to its second position of stability, i. e. the one in which the left-hand anode is cut out and the current flows in the right-hand anode.

If no other impulse is received from outside, after a predetermined time period that mainly depends on the value of condenser $C_3$ and resistance $R_7$, the circuit returns to its first position of equilibrium, and remains there until the arrival of another negative impulse on the left-hand grid. Tube $V_3$ is connected in a precisely similar circuit. The two double triodes are connected, as shown, over two coupling condensers $C_5$ and $C_4$ and uncoupling resistances $R_{15}$ and $R_{16}$, to the mid-point of a potentiometer $R_1$, which is the charging circuit of the left-hand anode of tube $V_1$. It is evident that any other suitable tilting (flip-flop or trigger) circuit device may be employed instead of the circuit described by way of example.

If the grid leak resistances of $R_7$ and $R_{12}$ are connected to suitable polarization (bias) voltages, one or the other of the tilting circuits associated with tubes $V_2$ and $V_3$ will pass from the first to the second position of equilibrium every time during the cycle of multivibrator tube $V_1$ that the left-hand anode of tube $V_1$ is subjected to an abrupt increase of current.

The grid polarizations (biases) connected to $R_7$ and $R_{12}$ are obtained by the voltages induced in the opposite ends of the secondary from the mid-point of voice frequency transformer $T_2$.

The primary of $T_2$ is connected to the anode of amplifier tube $V_4$. The voice currents proceeding from the telephone line at the terminals P are applied to transformer $T_1$ over the circuit $C_7$ and $R_{25}$, which as such constants that the voltage at the terminals of $R_{25}$ approximately represents the derivative of the voltage applied to the primary of $T_1$. This means that the voltages of the grid of tube $V_4$ represent the voltage differences $p_2$, $p_3$, etc. of Fig. 2*b* provided the cadence of exploration is sufficiently high for the curve of Fig. 2 to be practically a straight line between two consecutive moments of exploration or breakdown.

The voltage on the grid of tube $V_4$ accordingly reproduces the pulsations $p_2$, $p_3$, etc. of Fig. 2*b*. The grid bias applied to $R_7$, when negative, consequently corresponds to the values $+p_2$, $+p_3$, etc., while the grid bias applied to $R_{12}$, when negative, corresponds to $-p_2$, $-p_3$, etc. The constants of the circuit are adjusted in such a way that, if the voltage at the terminals of $T_2$ is zero, the negative impulses proceeding from potentiometer $R_1$ are of insufficient amplitude to actuate one or the other of the tilting circuits $V_2$ or $V_3$. The circuit is arranged in such a way that the tilting (tripping) can only occur in tubes $V_2$ or $V_3$ if the values of the respective grid biases proceeding from $T_2$ exceed the critical value indicated by *e* in Fig. 2*b*.

Consequently, at moment 2 (Fig. 2*b*; a voltage corresponding to $+p_2$ appears at the end of 27. Since it is higher than *e*, tilter (flip-flop tube) $V_2$ will operate. At the same moment, the voltage $-p_2$ will appear on resistance $R_{12}$, thus holding tube $V_3$ more firmly than before in its first position of equilibrium instead of causing it to tilt (flip). After a time interval, taken to be slight with respect to the interval between two successive explorations, tilting circuit $V_2$ returns to its first position. Rectifiers $W_1$ and $W_2$, shunted by resistances $R_{27}$ and $R_{28}$, prevent any undesirable interaction between the circuits of tubes $V_2$ and $V_3$.

The same process is repeated at instants 3 and 5, i. e. when tilter tube $V_2$ operates, and $V_3$ does not. At instant 4, no circuit will tilt. At instants 6 and 7, for which the voltage of $T_2$ is reversed, tilter tube $V_3$ operates and tilter tube $V_2$ does not. In this manner, it is possible to obtain impulses of constant amplitude of either sign that are equally spaced in time, and that correspond to the impulses $g_2$, $g_3$ of Fig. 2*c*. At the instant when tilter tube $V_2$ operates, a positive impulse appears on its left-hand anode, and is applied to the left-hand grid of the double triode $V_5$ across uncoupling resistance $R_{24}$ and condenser $C_8$. Similarly, when tube $V_3$ tilts, a negative impulse appears on its right-hand anode and is applied to the right-hand grid of tube $V_5$ across uncoupling resistance $R_{20}$ and condenser $C_{11}$. The right-hand grid has its leakage resistance $R_{22}$ grounded (or at a slightly negative bias). The left-hand grid of tube $V_5$ has its grid resistance $R_{23}$ connected to the negative polarization (bias) battery, thus putting the left-hand anode in cut-off position, except during the reception intervals of positive impulses that proceed from $V_2$. In the two anodes of $V_5$ there are thus obtained amplified impulses that correspond to the input impulses, but are of opposite sign. The constants are selected in such a way that the impulses proceeding from either anode of $V_5$ are of equal amplitude. The output circuit to a line, a modulator, etc. can extend across uncoupling resistances $R_{19}$ and $R_{30}$, condensers $C_9$ and $C_{10}$ and common resistance $R_{21}$. The output currents appear at the terminals Q.

Instead of directly employing positive, zero, or negative direct current impulses, as described above, these impulses may be employed to modulate a radio transmitter; if desired, they may both be positive and be separated so as to be transmitted by two radio transmitters at different frequencies. Other applications that fall within the scope of the present invention will be evident to those skilled in the art.

Figure 4:
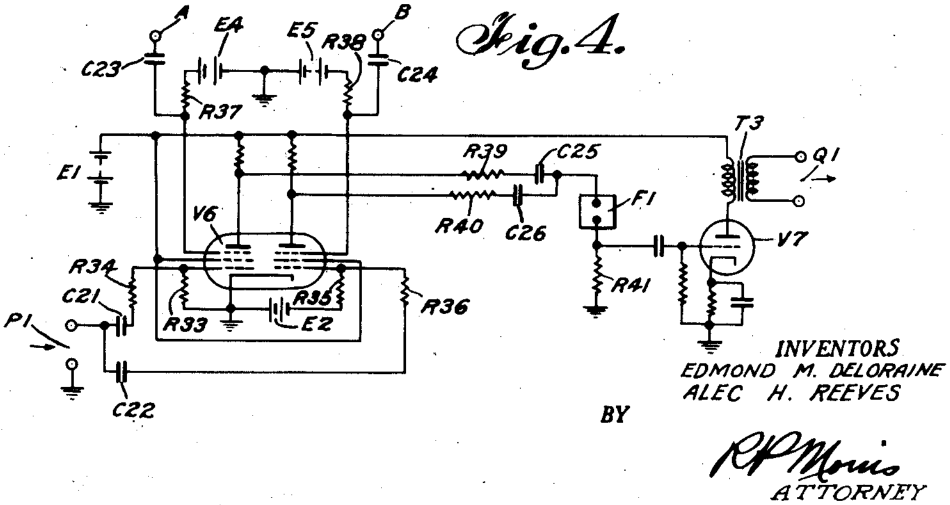
Fig. 4 illustrates one example of a receiving circuit for the signals transmitted by the circuit of Fig. 3.

Fig. 4 illustrates an example of a reception circuit for the signals transmitted by the circuit of Fig. 3. The signals transmitted by the circuit of Fig. 3 reach the terminals $P_1$ and are applied across condensers $C_{21}$ and $C_{22}$ and uncoupling resistances $R_{34}$ and $R_{36}$ to the control grids of the double pentode $V_6$.

The left-hand grid has its resistance $R_{33}$ grounded. The right-hand grid resistance $R_{35}$ is connected to a negative bias $E_2$. If suitable voltages are applied to the other electrodes, the negative impulses arriving at $P_1$ will cause an abrupt reduction of the current in the left-hand anode, while the limitation of the grid voltage due to the grid current will prevent the positive impulses on the left-hand grid from having any appreciable effect. Similarly, the positive impulses at $P_1$ will cause an abrupt increase from zero in the right-hand anode's current (the negative impulses applied at $P_1$ only increase the cut-off polarization voltage). The impulses applied at $P_1$ are of sufficient amplitude for the negative impulses to bring the left-hand anode to a complete cut-off, even in the presence of noise, and for the positive impulses at $Q_1$ to have their peaks cut on the right-hand grid by the effect of the grid current, even in the presence of noise. The left-hand suppressor grid is connected across resistance $R_{37}$ to a polarization battery $E_4$, while the right-hand suppressor grid is connected across resistance $R_{38}$ to the negative terminal of battery $E_5$. The first suppressor grid is connected across $C_{23}$ to a terminal A, and the second suppressor grid is connected across $C_{24}$ to a terminal B. A is connected to a local impulse generator having a negative value that is sufficient to neutralize the voltage of battery $E_4$ when the impulses are present. Similarly, B is connected to a local impulse generator that operates with exactly the same period as that of A, but in the opposite direction. The impulse applied at B is accordingly also sufficient to neutralize $E_5$. The constants of the circuit are such that it is only when a negative impulse arrives from A to the left-hand suppressor grid that a negative impulse proceeding from $P_1$ can cause a reduction of the current in the left-hand anode. Similarly, it is only during the arrival of the local positive impulses at B that the positive impulses proceeding from $P_1$ can bring about an increase of current in the right-hand anode. The local impulses applied at A and B have durations corresponding to the short time interval *d* shown in Fig. 1*a*. They are obtained by means of a local impulse oscillator (not shown) synchronized by a pilot current, in any known manner, in the circuit of multi-vibrator $V_1$ of Fig. 3. Tube $V_6$ thus acts as a "window," since it is only sensitive to the positive or negative impulses during the period *d* centered around instants that correspond to the instants $t_1$, $t_2$, etc. of Fig 1*b*. The noises at the receiver end, as long as their maxima do not exceed values corresponding to $+n$ (Fig. 1*a*), e. g. if they are 6 decibels less than the peak voltage of the signal impulses, cannot affect the impulse issuing from tube $V_6$ by a variation of amplitude or phase from the incoming impulse.

After uncoupling by resistances $R_{39}$ and $R_{40}$ and condensers $C_{25}$ and $C_{26}$, the impulses thus freed from noise on the two anodes of $V_6$, one positive and the other negative, are grounded across low-pass filter $F_1$ and resistance $R_{41}$. Filter $F_1$ constitutes the integrating element described in connection with Fig. 2*c*. It also eliminates the undesirable high frequency components of the impulse, and only permits passage of the voice frequencies. The current audible at the terminals of $R_{41}$ can then be amplified by tube $V_7$, as shown, and the current thus obtained can be applied to the terminals $Q_1$ of the telephone line.

Figure 5:
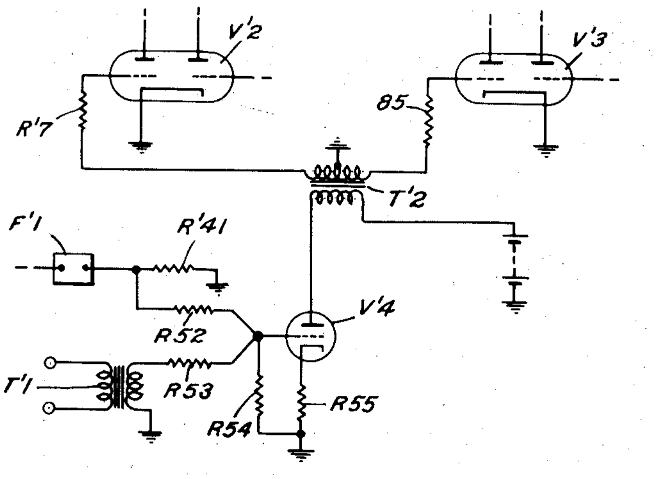
Fig. 5 illustrates another example of embodiment.

Another arrangement of a transmission system incorporating features of the invention is shown in Fig. 5, which is a modification of the arrangement shown in Fig. 3. Instead of employing the slope of the voice wave at the moment when the cut-off is made, it is possible to reestablish from the emitted impulses a local wave corresponding to the integrated value until the instant preceding the cut-off, and to compare this value with the new instantaneous intensity of the voice frequencies at the instant following the cut-off. If this new voice voltage differs from the above integrated value by a value greater than a predetermined value, a positive or negative impulse of constant amplitude can be emitted, depending on the direction of the variation. If the difference is less than the predetermined fixed value, no impulse is transmitted.

Fig. 5 shows an example of application of this kind, similar to that shown in Fig. 4, the receiver being connected to terminal Q of Fig. 3. In Fig. 5, $F'_1$ is a filter similar to filter $F_1$ of Fig. 4, and $R'_{41}$ is a resistance similart to resistance $R_{41}$ of Fig. 4. Filter $F'_1$ is provided with a very low time constant, about $^1/_{30}$ of a millisecond at least.

$T'_2$ corresponds to $T_2$ of Fig. 3, and tubes $V'_2$ and $V'_3$ correspond to tubes $V_2$ and $V_3$ respectively of Fig. 3.

The voice currents are applied from the incoming line through transformer $T'_1$ across uncoupling resistance $R_{53}$ to the grid of amplifier tube $V'_4$, which has a grid resistance $R_{54}$ and a cathode resistance $R_{55}$. The output circuit of a local receiver of the type shown in Fig. 4, i. e. the voltage at the terminals of resistance $R_{41}$, is also applied across uncoupling resistance $R_{52}$ to the grid of $V'_4$.

On examining the operation of the circuit at the instant when the voice wave has just been applied and is momentarily zero, and no impulse has yet been transmitted, the voltage at the terminals of resistance $R'_{41}$ will be zero and will remain so until the next cut-off period. Assuming that at this instant of the next cut-off, the voice potential proceeding from $T'_1$ to the grid of tube $V'_4$ is positive, since the voltage proceeding from $R'_{41}$ is zero, tube $V'_4$ will thus be made still more positive, causing an increase of the grid polarization (bias) by means of $T'_2$ on grid resistance $R'_7$ of $V'_2$, and an increase of the negative polarization (bias) on grid resistance $R'_{13}$ of $V'_3$. Tube $V'_3$ will thus operate, while tube $V'_2$ will remain unaffected. The operation of tube $V_3$ will cause the appearance of an impulse that generates an integrated potential at the terminals of $R'_{41}$. The connections are of such kind that the voltage at the terminals of $R'_{41}$ is negative for a positive voltage on the grid of tube $V'_4$ proceeding from $T'_1$, and has an amplitude equal to the abovementioned critical limit value *e* which determines the eventual transmission of another impulse.

If, therefore, at the instant of the next cut-off, the voice wave applied to tube $V'_4$ by the secondary of $T'_1$ has become still more positive, the grid of $V'_4$ will become still more positive if this increase of the positive voltage of the voice wave exceeds the negative value given by the first impuls integrated and applied to resistance $R'_{41}$. Tubes $V'_3$ and $V'_2$ will accordingly only operate if the voice frequency increases or decreases by a pre-determined value between one cut-off instant and the next with respect to the integrated value given by the receiving circuit of Fig. 4. This arrangement is thus of the negative feedback type. The impulses are stored in a local receiver of this type until they automatically furnish in its output circuit a voltage equal to the voice wave applied within the limits of the finite number of elementary cut-offs, as already explained. If the receiver at the other end of the line is of exactly the same type as that employed at the transmitting end, all distortions in the circuits of the receiver, filter, etc., within the limitations set by the cut-off process, are automatically eliminated. This is an advantage that the circuit of Fig. 5 has over that of Fig. 3.

Assuming, for example, a cut-off frequency of 30 kilocycles and an audio frequency band for transmission of 3000 cycles, with use only of positive impulses, i. e. a signal comprising a positive impulse or no impulse, the theoretical limit of modulation is the possibility of the 30 kilocycle impulse wave being modulated by all the frequencies from zero to 15 kilocycles. If, as in the described example, negative or zero impulses are also present, a second similar band is necessary, i. e. a total single band width of 30 kilocycles. If desired, it may also be used in the form of a single side band at a radio frequency, according to the case, and this gives a total transmitted band width equal to ten times that required for the transmission of the voice frequencies alone.

Although the present invention has been described for certain examples of embodiment, it is evident that it is by no means limited thereto, and that the same are capable of variants and modifications without departing from the scope of the invention.

*Résumé*

The present invention relates to transmission systems employing impulse modulation, in which the impulses are transmitted at quite definite fixed moments, and are of different kinds, e. g. negative, positive or zero, that characterize the variations of amplitude of the modulating or message transmitting current. At the receiving end, the message transmitting signal is restored by an integrating device. Since the impulses are of constant amplitude and are reproduced at quite definite intervals, it is possible to obtain increased protection against noise and parasitics.

We claim:

1. A communication system for transmitting a complex amplitude variable wave comprising means for producing at regularly-repeated intervals energy representative of the rate of change and direction of change of said wave in amplitude, and means for transmitting discrete signals of constant amplitude but variable polarity under control of said produced energy.

2. A system according to claim 1 further comprising means for receiving said discrete signals, and means responsive to said signals for reconstructing said wave.

3. A system according to claim 1 further comprising means for generating said discrete signals at predetermined regularly spaced intervals.

4. A communication system for transmitting a complex amplitude variable wave comprising a differentiating circuit for producing variations representative of the rate of change and the direction of change of amplitude of said wave, means for effectively sampling the output of said differentiating circuit at discrete intervals, and means responsive to the sampled output for transmitting a given variety of signals of constant amplitude but variable polarity indicative of the character of the differentiated signal during the sampling intervals.

5. A system according to claim 4, characterized by means for regularly timing said means for sampling to provide regular spaced timing of said intervals.

6. A system according to claim 5 further comprising a receiver for receiving said signals, and means at said receiver responsive to the received signals for substantially reconstructing said amplitude variable wave.

7. A communication system comprising a source of signal waves, means for differentiating said waves to produce a control voltage of a polarity dependent upon the direction of change of amplitude of said wave, a pair of trigger circuits biased for selective response to positive and negative voltages respectively, a multivibrator pulse generator, means for applying pulses from said pulse generator to said trigger circuits effectively to control the bias of said trigger circuits for response to the respective positive and negative voltages, means for applying said differentiated waves to said trigger circuits to selectively operate them during the periods of application of said pulses according to the polarity and amplitude of said voltages, a common output circuit for said trigger circuits coupled to receive positive pulses from one of said trigger circuits and negative pulses from the other of said trigger circuits, said pulses being of equal amplitude, and means for transmitting said pulses.

8. A receiver for the system defined in claim 7 comprising a pair of receiver tube circuits, means for applying the received positive and negative pulses to said tubes to render them selectively conductive, storage means for the pulse outputs of said tubes to provide an integrated differential wave simulating the signal wave voltage, and a filter for smoothing said derived wave to remove the high frequency components thereof.

9. A receiver for the system defined in claim 7 comprising a pair of receiver tube circuits, means for applying the received positive and negative pulses to said tubes to render them selectively conductive, gating means for rendering said tubes conductive for given time intervals only, storage means for the pulse outputs of said tubes, to provide an integrated differential wave simulating the signal wave voltage, a filter for smoothing said derived wave to remove the high frequency components thereof, and translating means for the output wave of said filter.

10. A receiver according to claim 9, further comprising means for synchronizing said gating means with the transmitter generator.

EDMOND MAURICE DELORAINE.
ALEC HARLEY REEVES.

REFERENCES CITED

The following references are of record in the file of this patent:

UNITED STATES PATENTS

| Number | Name | Date |
|---|---|---|
| 1,796,030 | Kell | Mar. 10, 1931 |
| 2,202,605 | Schroter | May 28, 1940 |
| 2,262,407 | Rath | Nov. 11, 1941 |
| 2,266,401 | Reeves | Dec. 16, 1941 |
| 2,272,070 | Reeves | Feb. 3, 1942 |
| 2,321,611 | Moynihan | June 15, 1943 |
| 2,419,547 | Grieg | Apr. 29, 1947 |
| 2,437,707 | Pierce | Mar. 16, 1948 |
| 2,466,230 | Goldberg | Apr. 5, 1949 |
| 2,467,486 | Krumhansl | Apr. 19, 1949 |